US012570290B2

(12) United States Patent
Ghandriz et al.

(10) Patent No.: US 12,570,290 B2
(45) Date of Patent: Mar. 10, 2026

(54) PREDICTIVE ENERGY AND MOTION MANAGEMENT FOR MULTITRAILER HEAVY-DUTY VEHICLES

(71) Applicant: VOLVO TRUCK CORPORATION, Gothenburg (SE)

(72) Inventors: Toheed Ghandriz, Mölndal (SE); Peter Nilsson, Hovås (SE); Bengt Jacobson, Mölnlycke (SE); Leo Laine, Härryda Västra Götaland (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 153 days.

(21) Appl. No.: 18/253,365

(22) PCT Filed: Nov. 19, 2020

(86) PCT No.: PCT/EP2020/082707

§ 371 (c)(1),
(2) Date: May 17, 2023

(87) PCT Pub. No.: WO2022/106004

PCT Pub. Date: May 27, 2022

(65) Prior Publication Data

US 2024/0001928 A1     Jan. 4, 2024

(51) Int. Cl.
    *B60W 30/18*       (2012.01)
    *B62D 59/04*       (2006.01)

(52) U.S. Cl.
    CPC ................. *B60W 30/18172* (2013.01); *B60W 30/18127* (2013.01); *B62D 59/04* (2013.01);
             (Continued)

(58) Field of Classification Search
    CPC ..... B60W 30/18172; B60W 30/18127; B60W 2300/145; B60W 2300/147;
             (Continued)

(56) References Cited

U.S. PATENT DOCUMENTS 5,747,683 A * 5/1998 Gerum .................. B60T 8/1708
                                         701/72
9,096,226 B2 * 8/2015 Yu .......................... B60W 30/02
             (Continued)

FOREIGN PATENT DOCUMENTS

CN       109476287 A * 3/2019 .............. B60T 8/171
CN       111452781 A * 7/2020 .............. B60L 15/20
             (Continued)

OTHER PUBLICATIONS

CN-115384529-A translation (Year: 2022).*
             (Continued)

*Primary Examiner* — Kyle T Johnson
(74) *Attorney, Agent, or Firm* — Jeffri A. Kaminski; Venable LLP

(57) ABSTRACT

A method is disclosed for controlling motion of a heavy-duty vehicle. Information is obtained related to an upcoming vehicle path and vehicle maneuver along the path; and related to a road friction coefficient along the path. Lateral and longitudinal wheel slip limits are configured for at least two wheels of an axle or lumped group-axle on the vehicle. The lateral and longitudinal wheel slip values are related to respective lateral and longitudinal tyre force values via a pre-determined combined tyre slip model. A vehicle motion profile is determined for performing the vehicle maneuver as a solution to a non-linear optimal control problem (NOCP). The NOCP is constrained by the lateral and longitudinal wheel slip limits and formulated to account for the road friction coefficient and/or curvature along the upcoming vehicle path. Motion of the vehicle is controlled along the path based on the determined target vehicle motion profile.

18 Claims, 6 Drawing Sheets

(52) U.S. Cl.
CPC . *B60W 2300/145* (2013.01); *B60W 2300/147* (2024.01); *B60W 2520/10* (2013.01); *B60W 2520/105* (2013.01); *B60W 2520/26* (2013.01); *B60W 2552/30* (2020.02); *B60W 2552/40* (2020.02)

(58) Field of Classification Search
CPC ....... B60W 2520/10; B60W 2520/105; B60W 2520/26; B60W 2552/30; B60W 2552/40; B60W 2050/0013; B60W 2300/14; B60W 2300/18; B60W 20/12; B60W 2552/15; B60W 2552/20; B60W 2720/103; B60W 2720/106; B60W 2720/125; B60W 2720/26; B62D 59/04; B62D 53/06; B62D 53/0864; B60T 2201/16; B60T 2210/20; B60T 2270/86; B60T 1/10; B60T 7/18; B60T 7/20; B60T 7/22; B60T 8/1708; F16D 61/00; B60Y 2200/142; B60Y 2200/1422
See application file for complete search history.

(56) References Cited

U.S. PATENT DOCUMENTS

| | | | | |
|---|---|---|---|---|
| 10,518,831 | B2 * | 12/2019 | Wright .................... | B60L 50/60 |
| 11,794,747 | B2 * | 10/2023 | Arikere .............. | B60W 40/105 |
| 11,938,923 | B1 * | 3/2024 | Chen ..................... | B60W 30/02 |
| 12,162,494 | B2 * | 12/2024 | Ghandriz ........ | B60W 30/18172 |
| 12,286,151 | B1 * | 4/2025 | Greiff .................... | B62D 13/06 |
| 2006/0055239 | A1 * | 3/2006 | Crombez ............. | B60W 20/13 |
| | | | | 303/152 |
| 2007/0055432 | A1 * | 3/2007 | Koibuchi .............. | B60W 40/11 |
| | | | | 701/72 |
| 2017/0225688 | A1 * | 8/2017 | Milanese ............. | B60W 30/02 |
| 2020/0298878 | A1 | 9/2020 | Lucet et al. | |
| 2022/0219691 | A1 * | 7/2022 | Maleki ................ | G06F 11/0754 |
| 2023/0415746 | A1 * | 12/2023 | Ghandriz ............. | B60W 50/06 |
| 2024/0001928 | A1 * | 1/2024 | Ghandriz .................. | B60T 1/10 |
| 2024/0059317 | A1 * | 2/2024 | Quirynen ............. | B60W 10/18 |

FOREIGN PATENT DOCUMENTS

| | | | | | |
|---|---|---|---|---|---|
| CN | 115384529 | A | * | 11/2022 | |
| DE | 19521544 | A1 | | 12/1996 | |
| DE | 102006017412 | A1 | | 10/2007 | |
| DE | 102009030784 | A1 | * | 2/2010 | ........... B60W 10/06 |
| DE | 102017211485 | A1 | | 1/2019 | |
| DE | 102019205947 | A1 | | 10/2020 | |
| GB | 2562308 | A | | 11/2018 | |
| WO | 2020083465 | A1 | | 4/2020 | |
| WO | WO-2025103589 | A1 | * | 5/2025 | ........... B60W 40/12 |

OTHER PUBLICATIONS

CN-109476287-A translation (Year: 2019).*
DE-102009030784-A1 translation (Year: 2010).*
CN-111452781-A translation (Year: 2020).*
Exploring assumptions and requirements for continuous modification of vehicle handling using non-linear optimal control_2011 (Year: 2011).*
Du-et-al-2014-side-slip-angle-estimation-and-stability-control-for-a-vehicle-with-a-non-linear-tyre-model-and-a-varying (Year: 2014).*
International Search Report and Written Opinion in corresponding International Application No. PCT/EP2020/082707 mailed Jul. 28, 2021 (15 pages).

Chen Changfang et al: "Hierarchical Adaptive Path-Tracking Control for Autonomous Vehicles", IEEE Transactions on Intelligent Transportation Systems, IEEE, Piscataway, NJ, USA, vol. 16, No. 5, Oct. 1, 2015 (Oct. 1, 2015), pp. 2900-2912, XP011670197, ISSN: 1524-9050, 001: 10.1109/TITS.2015.2426211 [retrieved on Sep. 25, 2015].
Krid Mohamed et al: "A new explicit dynamic path tracking controller using generalized predictive control", International Journal of Control, Automation and Systems, Korean Institute of Electrical Engineers, Seoul, KR, vol. 15, No. 1, Dec. 23, 2016 (Dec. 23, 2016), pp. 303-314, XP036139469, ISSN: 1598-6446, 001: 10.1007/S12555-015-0160-6 [retrieved on Dec. 23, 2016].
Julian P. Timings et al: "Efficient minimum manoeuvre time optimisation of an oversteering vehicle at constant forward speed", 2011 American Control Conference (ACC 2011) : San Francisco, California, USA, Jun. 29-Jul. 1, 2011, IEEE, Piscataway, NJ, Jun. 29, 2011 (Jun. 29, 2011), pp. 5267-5272, X P032034839, ISBN: 978-1-4577-0080-4.
Iuri Pereira Barros; "Energy consumption, Performance and Stability Analysis of Articulated Vehicles Powered with Electrified Dolly", Master's thesis, Department of Mechanics and Maritime Sciences, Division of Vehicle Engineering and Autonomous Systems, Chalmers University of Technology, 2018 (48 pages).
Kritayakirana, K., & Gerdes, J.C. (2012). Autonomous Vehicle Control at the Limits of Handling. International Journal of Vehicle Autonomous Systems, 10, 215 pages.
Källstrand, Björn. "Control allocation for vehicle motion control—Maximizing traction and steering capabilities under different road conditions." (2017), 94 pages.
Page "Kamm Circle." In: Wikipedia—The Free Encyclopedia. Edited on: May 15, 2023, 1:06 PM UTC. URL: https://de.wikipedia.org/w/index.php?title=Kammscher_Kreis&oldid=233745244, 4 pages.
"Driving dynamics control" page. In: Wikipedia—The Free Encyclopedia. Last edited: Aug. 17, 2025, 04:32 UTC. URL: https://de.wikipedia.org/w/index.php?title=Fahrdynamikregelung&oldid=258929527, 12 pages.
Anti-lock braking system, https://en.wikipedia.org/w/index.php?title=Anti-lock_braking_system&oldid=1297110234, 29 pages.
Page "Optimal control." In: Wikipedia—The Free Encyclopedia. Edited on: Jun. 3, 2024, 21:29 UTC. URL: https://de.wikipedia.org/w/index.php?title=Optimale_Regelung&oldid=245611490, 7 pages.
Optimal control, https://en.wikipedia.org/w/index.php?title=Optimal_control&oldid=1310796186, 10 pages.
E. Siampis, E. Velenis, S. Gariuolo and S. Longo, "A Real-Time Nonlinear Model Predictive Control Strategy for Stabilization of an Electric Vehicle at the Limits of Handling," in IEEE Transactions on Control Systems Technology, vol. 26, No. 6, Nov. 2018, doi: 10.1109/TCST.2017.2753169, 13 pages.
J. Goh, T. Goel, J. Cristian Gerdes, "A Controller for Automated Drifting Along Complex Trajectories", Dynamic Design Lab, 2 pages.
J. Goh, T. Goel, J. Cristian Gerdes, "A Controller for Automated Drifting Along Complex Trajectories", 14th International Symposium on Advanced Vehicle Control (AVEC 2018), 6 pages.
Model predictive control, https://en.wikipedia.org/w/index.php?title=Model_predictive_control&oldid=1314666331, 8 pages.
Circle of forces, https://en.wikipedia.org/w/index.php?title=Circle_of_forces&oldid=1185026903, 1 page.
Alsterda, John P., Matthew Brown, and J. Christian Gerdes. "Contingency model predictive control for automated vehicles." 2019 American Control Conference (ACC). IEEE, 2019, 6 pages.
J. P. Alsterda, M. Brown and J. C. Gerdes, "Contingency Model Predictive Control for Automated Vehicles, " 2019 American Control Conference (ACC), Philadelphia, PA, USA, 2019, doi: 10.23919/ACC.2019.8815260, 1 page.

* cited by examiner

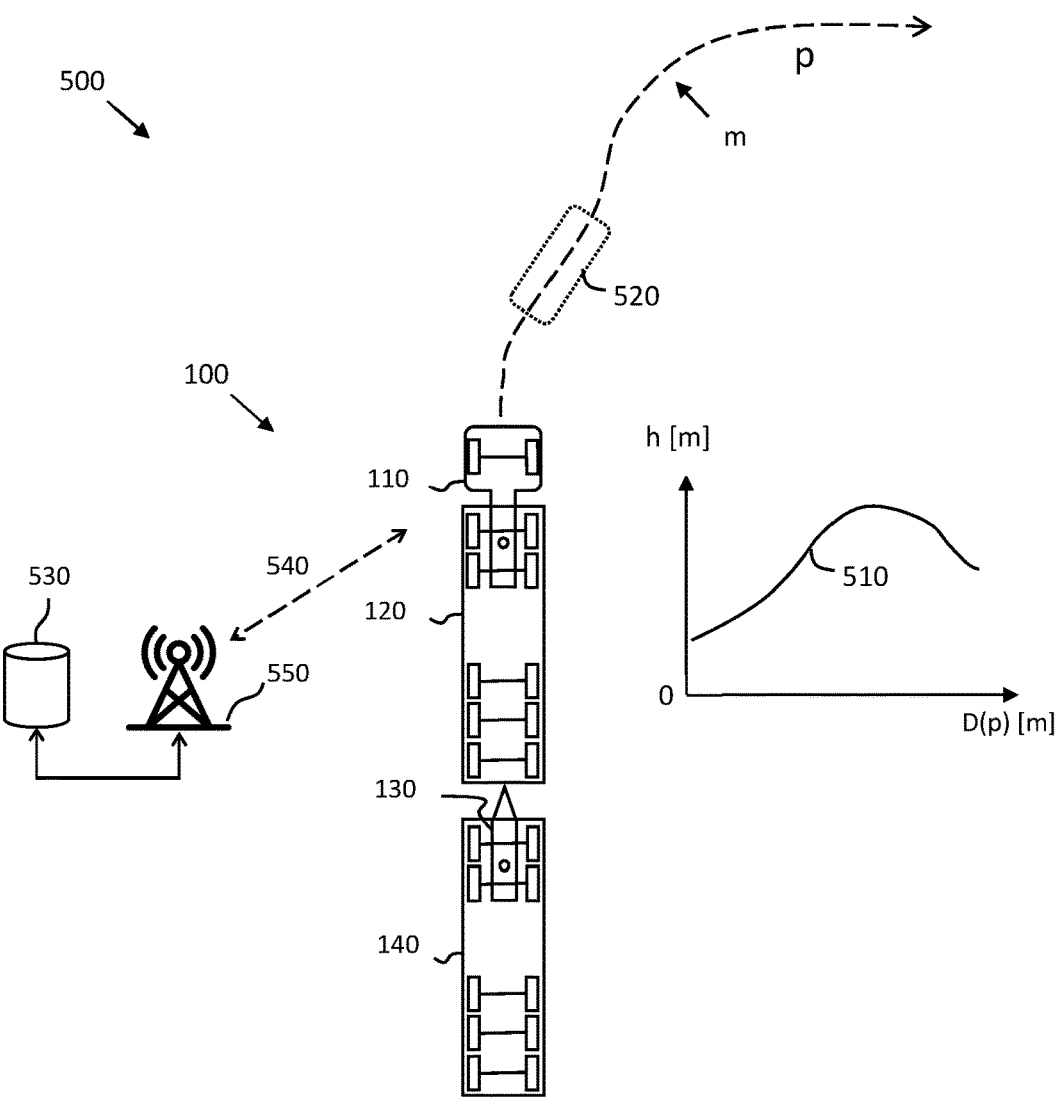
FIG. 5
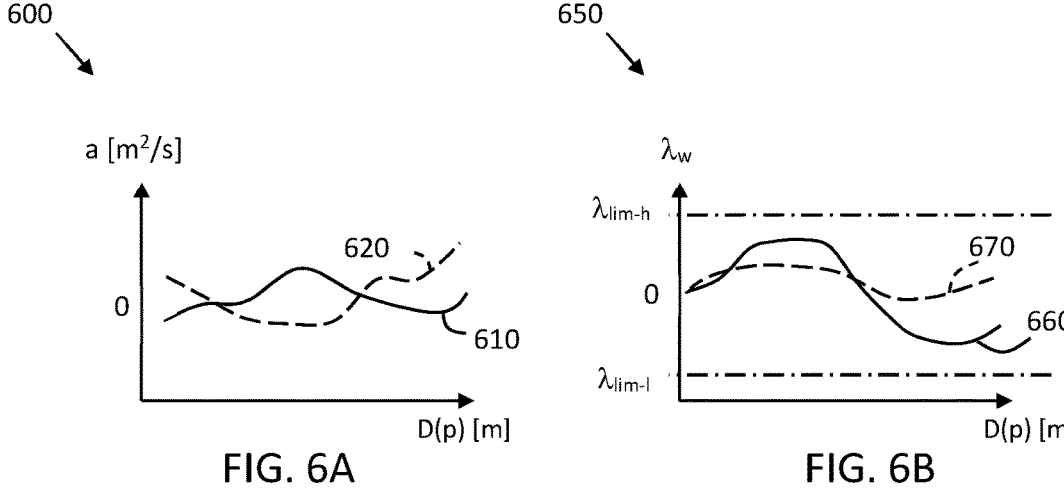
FIG. 6A
FIG. 6B

PREDICTIVE ENERGY AND MOTION MANAGEMENT FOR MULTITRAILER HEAVY-DUTY VEHICLES

CROSS-REFERENCE TO RELATED APPLICATIONS

This application is a U.S. National Stage application of PCT/EP2020/082707, filed Nov. 19, 2020 and published on May 27, 2022 as WO 2022/106004, all of which is hereby incorporated by reference in its entirety.

TECHNICAL FIELD

The present disclosure relates to heavy-duty vehicles for cargo transport, and in particular to multitrailer vehicles comprising one or more vehicle units. Although the invention will be described mainly with respect to semi-trailer vehicles and trucks, the invention is not restricted to this particular type of vehicle but may also be used in other types of vehicles.

BACKGROUND

A semitrailer vehicle normally comprises a tractor arranged to tow a trailer unit via a fifth wheel connection. In order to extend the cargo transport ability of the semitrailer vehicle, a dolly vehicle unit can be added to the vehicle combination, which allows for additional trailer units to be towed by the same tractor. A traditional dolly is an unpowered vehicle unit designed for connection to a tractor unit, truck, or prime mover vehicle with strong traction power.

Dolly vehicles comprising on-board energy sources such as electric machines and dolly vehicles with one or more steered axles have recently been proposed. Such dolly vehicles can provide additional power to the vehicle combination, thus reducing the traction power requirements imposed on the prime mover vehicle. Electrified dolly vehicles may also reduce overall fuel consumption by the vehicle combination, since they provide a degree of hybridization to conventional diesel-engine powered tractors. Steered axle dolly vehicles may furthermore be used for improved steering of the vehicle combination, e.g., when negotiating sharp curves.

U.S. Pat. No. 10,518,831 B2 relates to self-powered steerable dolly vehicles. Methods for controlling the dolly vehicles in order to, e.g., negotiate sharp turns, are disclosed. Methods for controlling propulsion and regenerative braking operations in dependence of an upcoming vehicle route to be travelled by the dolly vehicle are also discussed.

However, there is a need for further development and optimization of heavy-duty vehicle control in order to improve handling, reduce energy consumption, and improve overall vehicle performance in various situations.

SUMMARY

It is an object of the present disclosure to provide methods, control units and vehicles which alleviate at least some of the above-mentioned issues.

This object is at least in part achieved by a method for controlling motion of a heavy-duty vehicle. The method comprises obtaining information related to an upcoming vehicle path and vehicle maneuver along the path, configuring lateral and longitudinal wheel slip limits for at least two wheels of an axle or lumped group-axle on the heavy-duty vehicle, wherein lateral and longitudinal wheel slip values are related to respective lateral and longitudinal tyre force values via a pre-determined combined tyre slip model, and determining a vehicle motion profile for performing the vehicle maneuver along the path as a solution to a non-linear optimal control problem (NOCP) in a predictive manner, wherein the NOCP is constrained by the lateral and longitudinal wheel slip limits. The method also comprises controlling the motion of the heavy-duty vehicle along the path based on the determined target vehicle motion profile.

Thus, the vehicle looks ahead along a planned route and plans, e.g., optimal speed and tyre force allocation via control of the longitudinal and lateral tyre slips. The constraints on lateral and longitudinal wheel slip ensure that the vehicle travels safely along the planned path with an optimal speed, avoiding undesirable events such as excessive wheel slip, jack-knifing, etc. The method may also comprise obtaining information related to a road friction coefficient along the upcoming vehicle path, in which case the NOCP can be formulated to account for the road friction coefficient along the upcoming vehicle path.

According to aspects, the vehicle motion profile comprises a target tyre force or torque trajectory and/or a target wheel slip trajectory for at least two wheels to be followed along the upcoming vehicle path.

Controlling the vehicle to follow reference wheel slip trajectories enable a higher bandwidth control of the wheel actuators, thereby allowing for more accurate vehicle control with faster responses to changes in, e.g., road conditions. Alternatively, or in combination, the vehicle motion profile may comprise a target vehicle unit acceleration and/or a target vehicle speed to be followed along the upcoming vehicle path.

According to aspects, the heavy-duty vehicle comprises a propulsion actuator with regenerative braking capability on more than one driven axle, i.e., an electric machine. This electric machine may be a stand-alone propulsion unit or arranged in a hybrid drive arrangement together with a combustion engine or other propulsion device.

According to aspects, the method comprises determining the vehicle motion profile for performing the vehicle maneuver along the path as a solution to an NOCP wherein the NOCP is configured to minimize an energy consumption by the vehicle along the path. As will be shown in the following, this NOCP approach allows for optimal or at least near-optimal control of the vehicle, which is an advantage. The NOCP formulations considered herein also fit well into the proposed wheel-slip based control approach. A wide variety of different constraints can be added to the NOCP in order to obtain solutions meeting certain prerequisites and requirements.

According to aspects, the method also comprises converting the NOCP to a sequential program and determining the vehicle motion profile as a solution to the sequential program. The sequential program allows for solving the NOCP in an approximate low complex manner, albeit still with adequate accuracy and performance. For instance, methods comprising model predictive control (linear or nonlinear) can be used with advantage.

Several complexity reducing operations are proposed herein. For instance, the methods discussed herein may comprise any of configuring a nonlinear single-track vehicle model of the heavy-duty vehicle with lumped group-axles, reducing a number of states in one or more longitudinal dynamic equations of the NOCP, configuring two different levels of discretization for longitudinal and lateral dynamic equations of the NOCP, preferably a first discretization with a long time horizon for the longitudinal dynamic equations of the NOCP and a second discretization for the lateral dynamic equations of the NOCP that are active for a shorter time horizon, wherein the first discretization is more coarse than the second discretization, and configuring a linear time-varying (LTV) version of the lateral dynamic equations of the NOCP and/or the combined tyre slip model, where the LTV is linearized around an initial reference vehicle motion profile along the path (p).

According to aspects, the method also comprises solving a differential-algebraic system of equations (DAE) comprising algebraic equations of the combined tyre slip model of each of a set of lumped axles of the heavy-duty vehicle to find wheel speed reference trajectories for each axle on the heavy-duty vehicle, linearizing tyre equations $F_x = f_x(v_x, v_y, \omega)$ of each of the lumped axles around the corresponding wheel speed reference trajectory, and solving the resulting linearized equations for wheel speed symbolically, such that $\omega = f_{x,lin}^{-1}(v_x, v_y, F_x)$ for each wheel, and substituting the wheel speed expressions $\omega$ into respective expressions for lateral tyre force $F_y = f_y(v_x, v_y, \omega)$.

According to aspects, the method also comprises controlling the motion of the heavy-duty vehicle by issuing any of: an acceleration request, a wheel torque request, and/or a wheel slip request, in dependence of the vehicle motion profile to one or more actuator control units of the heavy-duty vehicle.

There is also disclosed herein control units and vehicles associated with the above discussed advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings:

FIG. 5 schematically illustrates a vehicle maneuvering along an upcoming path;

FIGS. 6A-C are graphs illustrating example target vehicle maneuvers;

DETAILED DESCRIPTION OF EXAMPLE EMBODIMENTS OF THE INVENTION

Figure 1A:
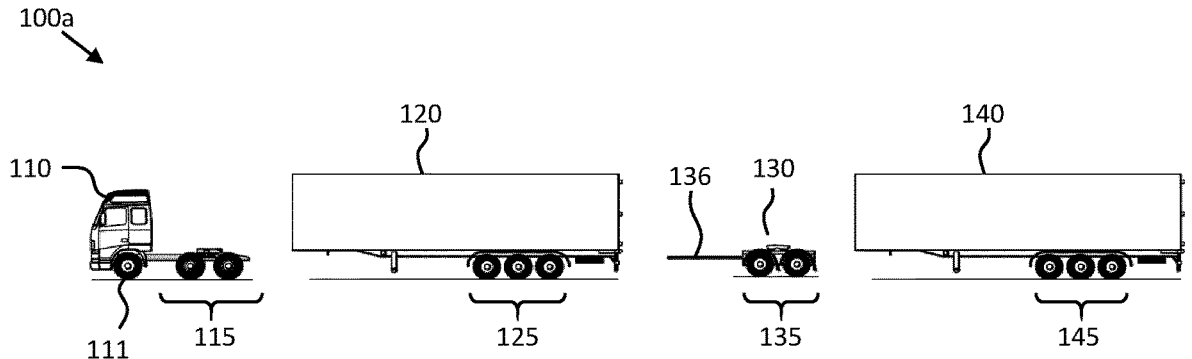
FIGS. 1A-B show example heavy-duty vehicle combinations.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

FIG. 1A illustrates an example vehicle combination 100*a* for cargo transport. The vehicle combination 100*a* comprises a truck or towing vehicle 110 configured to tow a first trailer unit 120 in a known manner, e.g., by a fifth wheel connection. To extend the cargo transport capability of the vehicle combination 100*a*, a dolly vehicle 130 can be connected to the rear of the first trailer 120 via a drawbar 136. This dolly vehicle can then tow a second trailer 140, thus increasing the cargo transport capacity of the vehicle combination. A second dolly vehicle unit can be connected to the second trailer 140 in order to tow a third trailer unit (not shown in FIG. 1A). Such heavy-duty vehicles 100*a* are referred to as multitrailer vehicles. In FIG. 1A, the towing vehicle is shown as comprising a front axle 111 and a lumped group-axle 115, while the second and first trailer units each comprise a lumped group-axle 125, 145. The dolly vehicle 130 is also shown comprising a lumped group-axle 135. Here, a lumped group-axle is considered to be a group of at least two adjacent axles that can be effectively treated as a single axle, e.g. by a control unit comprised in the vehicle.

Herein, a heavy-duty vehicle is taken to be a vehicle designed for the handling and transport of heavier objects or large quantities of cargo. As an example, a heavy-duty vehicle could be a semi-trailer vehicle or a truck. As another example, a heavy-duty vehicle could be a vehicle designed for use in construction or farming.

A dolly vehicle 130 is traditionally a passive vehicle comprising no driven or steerable axles, and with a relatively short wheelbase. It has recently been shown that self-powered dolly vehicles may provide both increased fuel efficiency and maneuverability. This type of self-powered dolly vehicle comprises an on-board energy source, such as a battery, super-capacitor or a fuel cell stack, and at least one pair of driven wheels. Some self-powered dolly vehicles may also be steerable. An example of self-powered steerable axles of this type suitable for use with self-powered dolly vehicle will be discussed in more detail below in connection to, e.g., FIGS. 2A and 2B. These driven axles can of course also be used with prime movers 110 and trailer units 120, 140.

Increased fuel efficiency is for instance obtained if an electric machine arranged for regenerative braking is installed in the dolly vehicle or self-powered trailer unit. The vehicle combination then effectively becomes a hybrid electric vehicle, even if the towing vehicle only comprises a traditional diesel engine with no on-board electric hybridization.

Adding a self-powered dolly vehicle 130 to the vehicle combination 100a can also improve startability, since the dolly vehicle is then able to generate extra torque when bringing the vehicle combination into motion from a standstill. Vehicle startability may be a limiting factor in the maximum load possible to carry, and a self-powered dolly vehicle may therefore contribute to an increased cargo capacity, which is an advantage.

Both the truck 110 and the self-powered steerable dolly vehicle 130 may comprise electric machines for propulsion and/or regenerative brakes for decelerating the vehicle unit while harvesting energy. The self-powered vehicle units also comprise respective energy sources. An energy source is normally a battery, super-capacitor, fuel cell or other device arranged to store electrical energy. However, an energy source may also comprise mechanical energy storage devices such as springs and compressed air tanks for pneumatic machines. Combinations of different types of energy sources can also be used. A traditional fuel tank for storing gasoline or diesel fuel can of course also be considered an energy source in this context. The present disclosure, however, focuses on propulsion arrangements based on electric machines powered by an electrical energy storage device, such as a battery or a fuel cell stack.

Aspects of the techniques disclosed herein are applicable to both self-powered and passive dolly vehicle units.

Figure 1B:
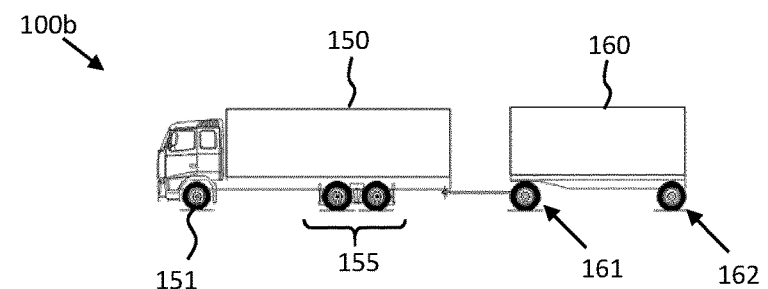

The teachings herein can also be applied to other vehicle combinations, and in particular to so-called truck and full trailer combinations 100b, illustrated in FIG. 1B, which may also comprise more than one trailer unit. These vehicles comprise a truck 150 arranged to tow a full trailer unit 160. In FIG. 1B, the truck 150 is shown as comprising a front axle 151 and a lumped group-axle 155. A full trailer unit is a trailer which is able to fully support itself on the ground, i.e., it comprises both front 161 and rear 162 trailer axles. The front axle 161 can be self-powered and also steerable just like that of the dolly vehicle unit 130. Thus, most if not all of the techniques, devices and methods discussed herein are also applicable to heavy-duty vehicles like that shown in FIG. 1B.

Figure 2A:
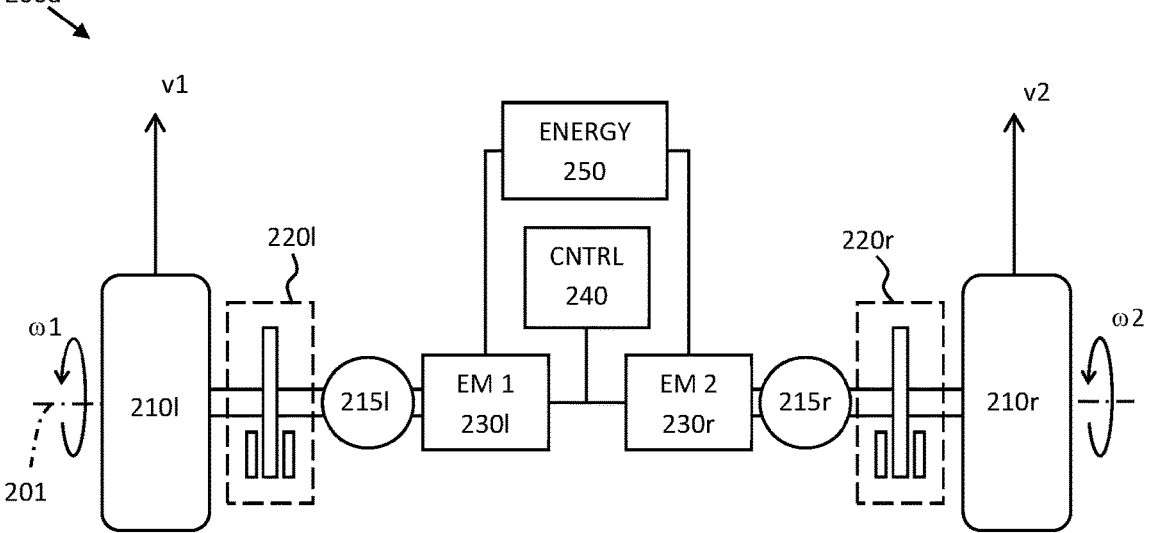
FIGS. 2A-B illustrate example driven axles on a heavy-duty vehicle.
Figure 2B:
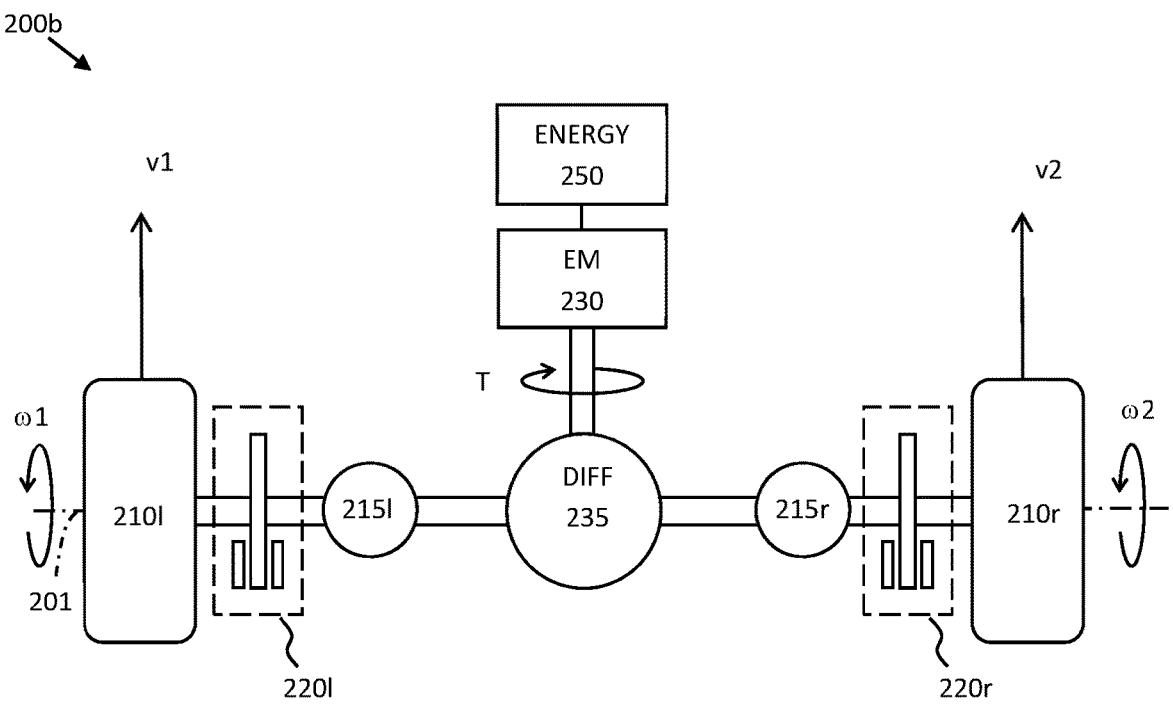

FIGS. 2A and 2B schematically illustrate example driven axle arrangements 200a, 200b which can be used with, e.g., the self-powered dolly vehicle unit 130 or the full trailer 160. The driven axle arrangements comprise an axle 201 with left- and right-hand side driven wheels 210l, 210r. The axle is powered by a propulsion arrangement. The example 200a shown in FIG. 2A comprises a propulsion arrangement comprising an energy source 250 connected to two electrical machines 230l, 230r which each drive one of the left and right wheels 210l, 210r. The example driven axle arrangement 200b shown in FIG. 2B comprises a propulsion arrangement also comprising an energy source 250, connected to a single electrical machine 230, which in turn powers the left and right wheels 210l, 210r via a differential 235. In both example driven axle arrangements 200a, 200b, the wheel angular velocities $\omega 1$, $\omega 2$ and wheel speeds v1, v2 can thus differ between the left and right wheels.

The example driven axle arrangements 200a, 200b may also comprise active an active suspension 215l, 215r, arranged to maintain a desirable height of the vehicle unit relative to the ground. The active suspension 215l, 215r may be controlled by a control unit 240 like the one shown in FIG. 2A.

It is appreciated that the arrangements shown in FIGS. 2A and 2B are also applicable to the front axle of a full trailer vehicle unit 160, and could also be used in regular trailer units 120, 140, as well as in trucks 110, 150. Thus, the heavy-duty vehicles discussed herein may comprise a propulsion actuator with regenerative braking capability on more than one driven axle.

Both the towing vehicle 110 and the steerable dolly vehicle 130 (as well as trailer units 120, 140, 160) may comprise control units, which will be discussed in more detail below in connection to FIG. 8. These control units can be arranged according to a layered functional architecture where some functions may be comprised in a traffic situation management (TSM) layer and some other functions may be comprised in a vehicle motion management (VMM) layer.

Generally, the TSM layer plans vehicle operation with a time horizon of, e.g., 10-30 seconds. This time frame for instance corresponds to the time it takes for the vehicle to negotiate a curve, i.e., to transition from driving straight to entering the curve and then exiting the curve again, or driving up a hill. The TSM layer may continuously request desired acceleration profiles ($a_{req}$) and curvature profiles ($c_{req}$) from the VMM layer. The VMM layer operates with a time horizon of about 1 second or so, and continuously transforms the acceleration profiles and curvature profiles into control commands, sometimes referred to as requests, for the various motion support device (MSD) functions on the vehicle, i.e., it among other things performs MSD coordination.

Alternatively, or as a complement, the TSM layer may determine preferred wheel force or wheel slip profiles for performing a desired maneuver, and request these profiles from the VMM layer. The VMM layer then coordinates MSDs with a target to generate the requested wheel forces or wheel slips, possibly in combination with an acceleration and a curvature profile.

Figure 3:
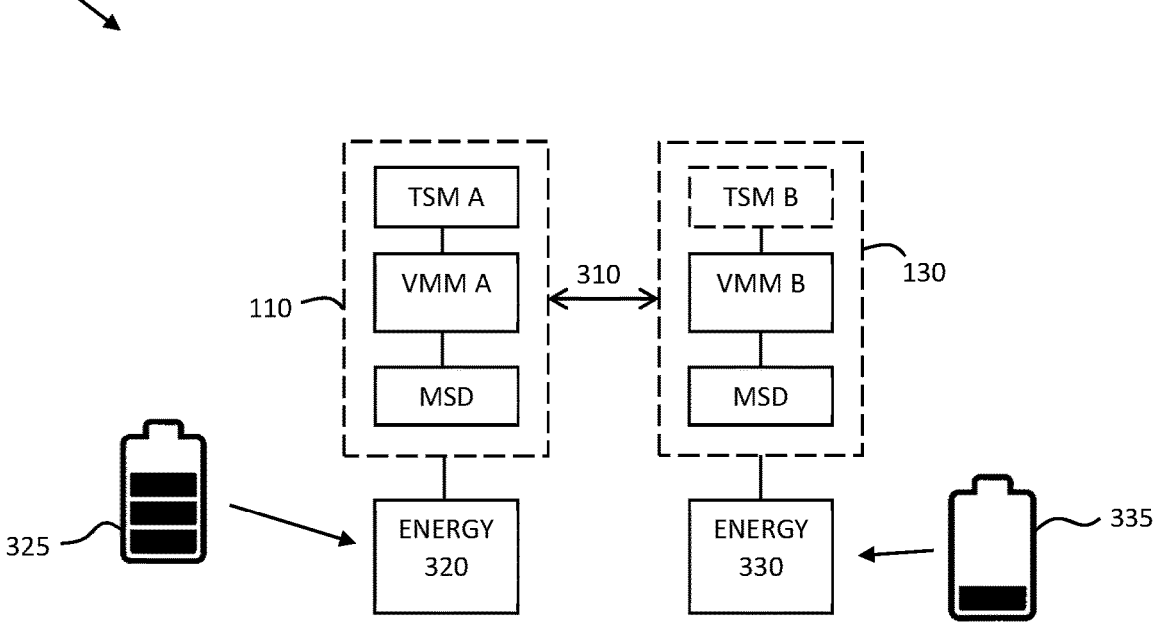
FIG. 3 schematically illustrates an electrical energy storage system.

FIG. 3 schematically shows an example vehicle control stack 300 in which various vehicle control functions are incorporated. The towing vehicle 110 comprises one stack, and the dolly vehicle 130 comprises another stack. The two stacks are connected via an interface 310 which may be a wired interface or a wireless interface. A truck comprising a control unit implementing both TSM and VMM functions may then act as master, while the one or more dolly vehicles in a vehicle combination operate in a slave mode. Thus, although the control unit in the dolly vehicle 130 may comprise a stand-alone TSM function (TSM B), this function is at least partly inactivated in FIG. 3 since the TSM functions are being executed by the master control unit in the truck 110.

The vehicle control stack 300 may, e.g., communicate energy levels between units and perform energy transfer between energy sources 320, 330. For instance, if electrical machines are installed capable of both propulsion and regenerative braking, then energy can be transferred between two vehicle units by one unit applying positive torque and the other unit applying negative torque.

The control stacks of each vehicle unit can be used to manage energy levels in the respective energy sources 320, 330 in a distributed or in a centralized manner. Each energy source may be associated with a desired state of charge (SOC) 325, 335 which represents an energy source energy level above a minimum state of charge which is associated with malfunction of a control unit and/or a motion support device of the target vehicle unit. For instance, a self-powered vehicle unit having a totally depleted energy source may not be able to provide sufficient power for an on-board control unit to operate, and thus not perform any control functions. An insufficient energy level may also render motion support devices such as steering, propulsion and braking useless, which may render safety functions such as stability control systems and the like useless.

By determining vehicle unit motion using, e.g., global positioning systems, vision-based sensors, wheel speed sensors, radar sensors and/or lidar sensors, and translating this vehicle unit motion into a local coordinate system of a given wheel $210l$, $210r$ (in terms of, e.g., longitudinal and lateral velocity components), it becomes possible to accurately estimate wheel slip in real time by comparing the vehicle unit motion in the wheel reference coordinate system to data obtained from the wheel speed sensor arranged in connection to the wheel.

Figure 4:
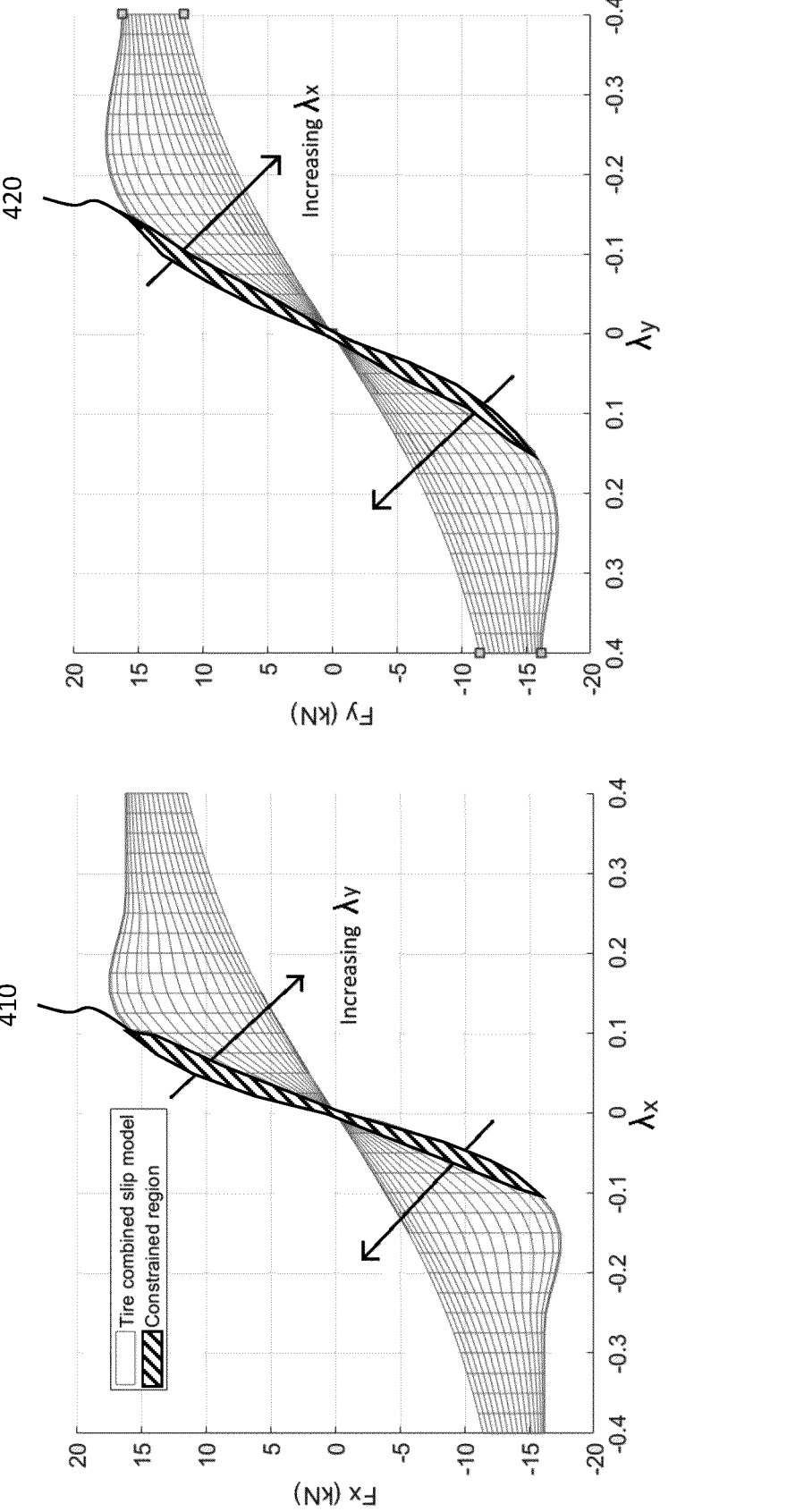
FIG. 4 is a graph illustrating an example combined tyre slip model.

A tyre model, exemplified in FIG. 4, can be used to translate between a desired longitudinal or lateral tyre force Fx, Fy for a given wheel and an equivalent wheel slip $\lambda_x$, $\lambda_y$ for the wheel. The relationship between longitudinal force Fx and longitudinal wheel slip $\lambda_x$ depends on lateral wheel slip $\lambda_y$.

Wheel longitudinal slip $\lambda_x$ relates to a difference between wheel rotational velocity and speed over ground and will be discussed in more detail below. Wheel speed $\omega$ is a rotational speed of the wheel, given in units of, e.g., rotations per minute (rpm) or angular velocity in terms radians/second (rad/sec) or degrees/second (deg/sec). A tyre model is a model of wheel behavior which describes wheel force generated in longitudinal direction (in the rolling direction) and/or lateral direction (orthogonal to the longitudinal direction) as function of wheel slip. In "Tyre and vehicle dynamics", Elsevier Ltd. 2012, ISBN 978-0-08-097016-5, Hans Pacejka covers the fundamentals of tyre models. See, e.g., chapter 7 where the relationship between wheel slip and longitudinal force is discussed. The combined slip tire model has the form $$F_x = f_x(v_{wx}, v_{wy}, \omega)$$

$$F_y = f_y(v_{wx}, v_{wy}, \omega)$$

or, equivalently, through definition of longitudinal slip $\lambda_x$ and lateral slip $\lambda_y$ as in FIG. 4:

$$F_x = \bar{f}_x(\lambda_x, \lambda_y)$$

$$F_y = \bar{f}_y(\lambda_x, \lambda_y)$$

The longitudinal and lateral slips can, for example, be defined as $$\lambda_x = \frac{R\omega_x - v_x}{\max(|R\omega_x|, |v_x|)}$$

$$\lambda_y = \frac{v_y}{\max(|R\omega_x|, |v_x|)}$$

where R is the radius of the tire and $v_x$ and $v_y$ are longitudinal and lateral tire velocities in the tire frame of reference, and $\omega_x$ represents wheel rotational velocity in longitudinal direction.

The above definition of longitudinal wheel slip $\lambda_x$ is in accordance with SAE J670 (SAE Vehicle Dynamics Standards Committee Jan. 24, 2008). The longitudinal wheel slip is bounded between −1 and 1 and quantifies how much the wheel is slipping with respect to the road surface. Wheel slip is, in essence, a speed difference measured between the wheel and the vehicle. Thus, the herein disclosed techniques can be adapted for use with any type of wheel slip definition.

It is also appreciated that a wheel slip value is equivalent to a wheel speed value given a velocity of the wheel over the surface, in the coordinate system of the wheel.

In FIG. 4 the area where the longitudinal and lateral slips result in forces that are always smaller than the peak allowable force are shown as constrained regions 410, 420. This means that, for example for lateral force, there is always some available force (the force increases) if the tire lateral slip increases. If then by optimization or other methods it is ensured that the vehicle control solution always remains in this constrained region, then excessive wheel slip and undesired events such as jack-knifing and trailer swing is avoided. In other words, by solving the vehicle control problem under these types of constraints, it is ensured that vehicle slip is always kept within reasonable limits.

It is noted that the road friction coefficient μ plays an important role in determining the range of longitudinal forces that can be generated.

To summarize, the VMM function manages both force generation and MSD coordination, i.e., it determines what forces are required at the vehicle units in order to fulfil the requests from the TSM function, for instance to accelerate the vehicle according to a requested acceleration profile requested by TSM and/or to generate a certain curvature motion by the vehicle also requested by TSM. The forces may comprise e.g., yaw moments Mz, longitudinal forces Fx and lateral forces Fy, as well as different types of torques to be applied at different wheels.

For instance, the VMM function keeps track of the state of charge of the electrical energy system (ESS) of the vehicle, i.e., the traction batteries or the fuel cell system as well as the current state of any brake resistors, and determines how to best meet braking torque requirements by the electric machines 230, 230l, 230r and by the friction brakes 220l, 220r on the different axles of the vehicle combination.

The interface between VMM and MSDs capable of delivering torque to the vehicle's wheels has, traditionally, been focused on torque based requests to each MSD from the VMM without any consideration towards wheel slip. However, this approach has significant performance limitations. In case a safety critical or excessive slip situation arises, then a relevant safety function (traction control, anti-lock brakes, etc.) operated on a separate control unit normally steps in and requests a torque override in order to bring the slip back into control. The problem with this approach is that since the primary control of the actuator and the slip control of the actuator are allocated to different electronic control units (ECUs), the latencies involved in the communication between them significantly limits the slip control performance. Moreover, the related actuator and slip assumptions made in the two ECUs that are used to achieve the actual slip control can be inconsistent and this in turn can lead to sub-optimal performance. Excessive wheel slip is also associated with energy waste and is therefore to be avoided from both a safety perspective as well as from an energy efficiency perspective.

Significant benefits can be achieved by instead using a wheel speed or wheel slip based request on the interface between VMM and the MSD controller, thereby shifting the difficult actuator speed control loop to the MSD controllers, which generally operate with a much shorter sample time compared to that of the VMM function. Such an architecture can provide much better disturbance rejection compared to a torque based control interface and thus improves the predictability of the forces generated at the tyre road contact patch.

The VMM and optionally also the MSD control units maintain information on $v_x$ (in the reference frame of the wheel), while a wheel speed sensor or the like can be used to determine $\omega_x$ (the rotational velocity of the wheel).

In order for a wheel (or tyre) to produce a wheel force, slip must occur. For smaller slip values the relationship between slip and generated force are approximately linear, where the proportionality constant is often denoted as the slip stiffness of the tyre. A tyre is subject to a longitudinal force $F_x$, a lateral force $F_y$, and a normal force $F_z$. The normal force $F_z$ is key to determining some important vehicle properties. For instance, the normal force to a large extent determines the achievable longitudinal tyre force $F_x$ by the wheel since, normally, $F_x \leq \mu F_z$, where $\mu$ is a friction coefficient associated with a road friction condition. The maximum available lateral force for a given lateral slip can be described by the so-called Magic Formula as described in "Tyre and vehicle dynamics", Elsevier Ltd. 2012, ISBN 978-0-08-097016-5, by Hans Pacejka.

To ensure safe and energy efficient maneuverability, future information about the upcoming road and maneuver can be used for optimal combined control of the braking and propulsion of the various MSDs in the vehicle combination, as well as the steering in case of driving automation systems of level three and higher. In a control unit arranged to perform such functions, the vehicle speed can be jointly adjusted optimally (regarding the energy usage) together with limiting the tyres lateral and longitudinal slips. This control unit is a high-level control unit that generates safe and energy-efficient acceleration requests based on the direct constraints on all tyres lateral and longitudinal slips, on different road frictions. This means a safe maneuverability since, as the result of optimal control, none of the vehicle tyres (or axles) experience a high lateral side slip that results in vehicle lateral instability, or a high longitudinal slip that results in frequent activation of low-level slip controllers (if any). Any vehicle including multitrailer vehicle units with distributed propulsion on different axles can use the functionality disclosed herein. Moreover, any tyre model can be used for prediction of the longitudinal and lateral forces, therefore the control unit functionality is not limited by a specific tyre model but can be used with a wide variety of different tyre models.

The motion of a vehicle together with the actuation of the MSDs can be planned in such a way that peak lateral and longitudinal forces of tyres (tyres of the lumped axles) are not reached during driving. In this way, excessive lateral side-slip of the axles, as the result of the high longitudinal slip and/or the lateral acceleration, is avoided. Therefore, critical situations and instability of the vehicle combination such as jack-knifing and trailer swing are also avoided. Achieving this safe driving situation involves adjusting the vehicle velocity which, as discussed herein, can be done optimally and jointly with predictive energy management strategies for minimizing energy consumption of the heavy-duty vehicle. By using the techniques disclosed herein, the requests that are produced in a high-level energy management and motion control unit (such as the TSM function discussed above) are ensured to be feasible for the lower-level control units regarding the tyre-road contact dynamic. Moreover, because of the detailed vehicle and tyre models used in the high-level control unit, more accurate safety factors, which vary with known physical conditions, can be used in the high-level control unit in contrast with using more conservative safety factors and control margins which normally tend to increase vehicle energy consumption.

Figure 7:
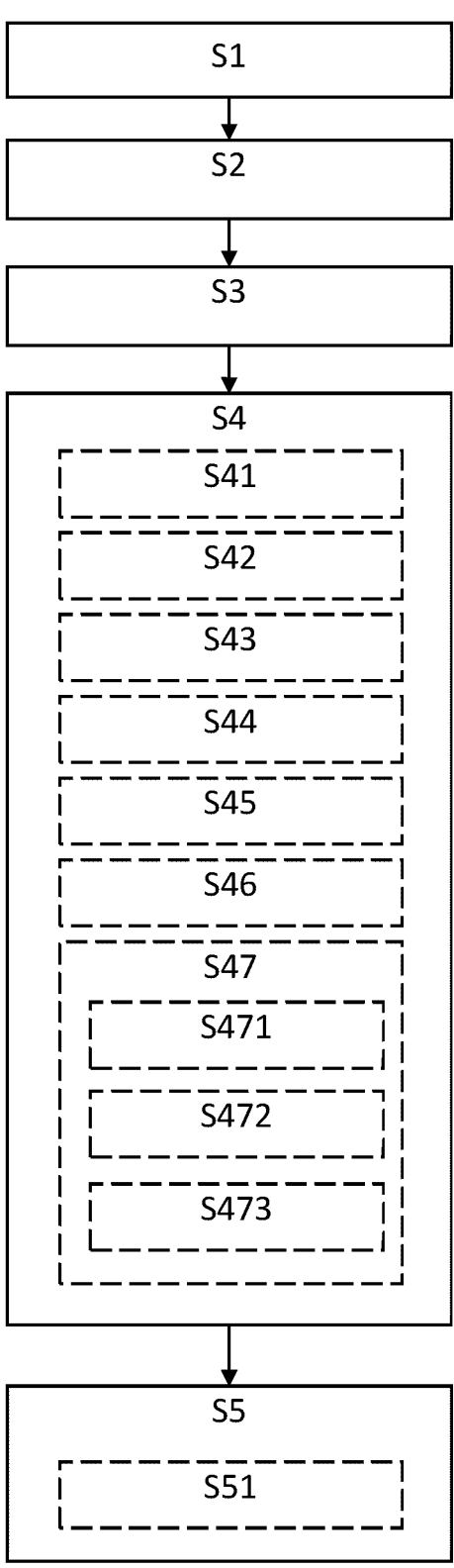
FIG. 7 is a flow chart illustrating methods.

With reference to FIG. 5, which schematically illustrates a vehicle maneuver 500, and also to FIG. 7, there is disclosed herein a method for controlling motion of a heavy-duty vehicle 100*a*, 100*b*. The method comprises obtaining S1 information related to an upcoming vehicle path p and vehicle maneuver along the path. The path p may, for instance, be a stretch of road associated with a height profile 510 and perhaps also a section with reduced friction 520, as well as a turn maneuver m to be executed by the vehicle 100. A distance D of the path p may be between 50-1000 m, and preferably between 50-300 m or so. Of course, predictions for longer paths are associated with deteriorated accuracy towards the end of the path. The vehicle maneuver m may, e.g., comprise a road speed limit to be adhered to, turning maneuvers, speed change maneuvers, and the like.

The method optionally comprises obtaining S2 information related to a road friction coefficient along the upcoming vehicle path p. This means that the vehicle 100 either estimates a road friction coefficient using on-board sensors such as cameras, infra-red sensors, and thermometers, or receives road friction reports from a remote server 530 by wireless link 540 via a radio base station 550.

The method comprises configuring S3 lateral and longitudinal wheel slip limits m for at least two wheels of an axle 111, 151, 161, 162 or lumped group-axle 115, 125, 135, 145 on the heavy-duty vehicle 100*a*, 100*b*, wherein lateral and longitudinal wheel slip values are related to respective lateral and longitudinal tyre force values $F_x$, $F_y$ via a predetermined combined tyre slip model, such as that illustrated in FIG. 4. The wheel slip limits $\lambda_{lim}$ may, e.g., be pre-configured by the vehicle manufacturer or by the tyre provider.

The wheel slip limits may be interpreted as defining a constrained region 410, 420 as indicated in FIG. 4. According to an example, the constrained region may be defined so as to ensure operation in the linear tyre force region where generated tyre force is an essentially linear function of wheel slip, where the wheel slip stiffness is indicative of the proportionality constant of this linear relationship. As shown in FIG. 4, the longitudinal slip stiffness decreases with increasing lateral wheel slip, and the lateral wheel slip stiffness decreases with increasing longitudinal wheel slip. It is also appreciated that, for excessive longitudinal wheel slip, it is only possible to generate very small lateral tyre forces. Thus, if the vehicle enters into a turn with excessive longitudinal wheel slip, it becomes impossible to generate the required lateral wheel forces to successfully negotiate the turn.

The method further comprises determining S4 a vehicle motion profile a for performing the vehicle maneuver m along the path p as a solution to a non-linear optimal control problem (NOCP). This NOCP is formulated so as to be constrained by the lateral and longitudinal wheel slip limits $\lambda_{lim}$ and optionally also formulated to account for the road friction coefficient $\mu$ along the upcoming vehicle path p. This means that the solutions obtained by solving the NOCP are safe in respect of tyre forces—the acceleration profiles can be requested from the VMM without risking excessive wheel slips. The objective function can, as will be discussed in more detail below comprise any number of performance metrics such as energy consumption, driver comfort including jerkiness, time to traverse the vehicle path, battery degradation, tyre wear, driver salary and the like. The objective function can also be a constant, i.e., 1, which means that all solutions to the NOCP which meet the constraints are considered equally good.

Thus, controlling S5 the motion of the heavy-duty vehicle 100 along the path p based on the determined target vehicle motion profile a will not generate excessive wheel slip, which is an advantage. Generally, controlling S51 the motion of the heavy-duty vehicle 100a, 100b may be achieved by issuing any of: an acceleration request, a wheel torque request, and/or a wheel slip request, in dependence of the vehicle motion profile a to one or more actuator control units of the heavy-duty vehicle 100a, 100b.

FIG. 6A illustrates an example vehicle motion profile 600 which can be requested from, e.g., the VMM layer. This profile comprises an acceleration vector with longitudinal 610 and lateral 620 components which can be requested safely from the VMM function without risking excessive wheel slip.

FIG. 6B instead shows an example vehicle motion profile 650 comprising wheel slips 660, 670 of, e.g., the wheels of an axle. Note that the wheel slips stay within the constrained wheel slip region defined by the high and low wheel slip limits $\lambda_{lim-h}$ and $\lambda_{lim-l}$.

According to some preferred aspects, the method comprises determining S41 the vehicle motion profile a for performing the vehicle maneuver m along the path p as a solution to a NOCP which is configured to minimize an energy consumption by the vehicle along the path p. Thus, the vehicle looks ahead and plans optimal speed, battery state of charge, and tyre forces via control of the longitudinal and lateral tyre slips in an optimal manner.

Consequently, according to an example, the NOCP can be defined as follows:

Find Forces of Internal combustion engine (ICE), electric motors (EMs), brakes, and gears
to minimize Objective function comprising, e.g., energy consumption (electric 1.1 and/or diesel) over a prediction horizon
subject to conversion of the decision variables to the distributed lumped 1.2 axles longitudinal forces,
(multitrailer) vehicle longitudinal dynamic equation, 1.3
(multitrailer) vehicle distributed lateral dynamic equations, 1.4
(any) tyre combined slip model for each lumped axle, 1.5
battery state of charge (SOC) dynamic, 1.6
time dynamic, 1.7
initial and terminal states, 1.8
ICE torque upper limit, 1.9
EM torque limits, 1.10
arrival time, 1.11
battery SOC limits, 1.12
battery power limits, 1.13
speed limits, 1.14
ICE torque (force) lower limit, 1.15
friction brake force (inaccurate) limits, 1.16
constraints on lateral and longitudinal slips of the all lumped axles 1.17
constraints on total tyre force of the all lumped axles (not limited to friction ellipse combined tyre slip model.) 1.18
constraints on lateral acceleration of all vehicle units 1.19

The proposed control unit can use any tyre combined slip model in the form $$F_x = f_x(v_x, v_y, \omega)$$

$$F_y = f_y(v_x, v_y, \omega)$$

where $F_x$ and $F_y$ are the tyre's longitudinal and lateral forces given by functions $f_x$ and $f_y$ respectively, and $v_x$, $v_y$ are the tyre longitudinal and lateral speeds in local tyre frame, and $\omega$ is the tyre rotational speed. Note that $f_x$ in general is not an invertible function, i.e., if $F_x$, $v_x$ and $v_y$ are known, $\omega$ cannot be directly calculated unless by numerical iterations.

The states of the optimal control problem may comprise the first vehicle unit 110 longitudinal speed $v_x$, first vehicle unit 110 lateral speed $v_y$, first vehicle unit 110 yaw angle $\phi_1$, and their time derivatives, articulation angles $\theta_1$, $\theta_2$, $\theta_3$ and their time derivatives, as well as the time t and state of charge SOC of batteries.

Figure 10:
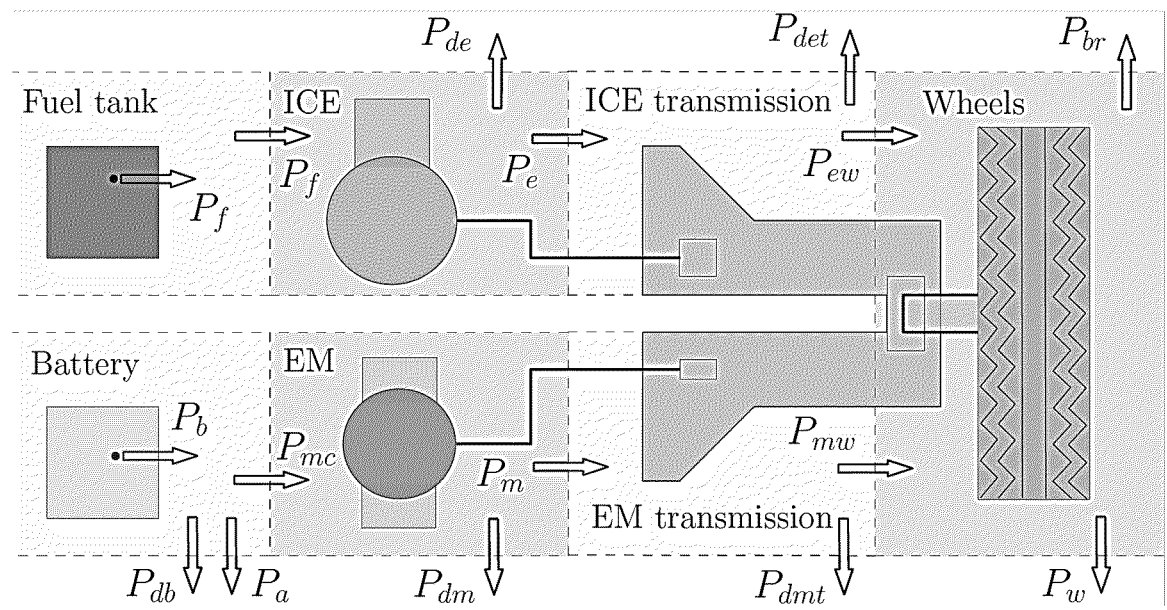
FIG. 10 schematically illustrates a model of a vehicle powertrain.

The NOCP defined above can be solved based, e.g., on a model of a vehicle powertrain, as illustrated schematically in FIG. 10. For example, dynamic equations of a parallel hybrid powertrain comprising one or more electric machines (EM) and internal combustion engines (ICE) can be derived, as can equations for evaluating fuel consumption, electric energy consumption, state of charge of batteries, and energy dissipated in different parts of the powertrain. Notably, conventional and fully electric powertrains can be derived from the equations of the hybrid powertrain in a straight-forward manner by setting weight parameters to effectively zero out contributions from the ICE or from the EM.

The total force at the wheels $F_w(t)$, i.e., the sum of forces acting on wheels caused by propulsion and braking, at time t, is given by $$F_w(t) = m\dot{v}_x(s) + F_g(s(t)) + F_{roll}(S(t)) + F_{air}(v_x(t)) + F_{steer}(s(t))$$

where m is the vehicle total mass or equivalent total mass, s(t) is the travelled distance at time t, $F_g$ is the road grade, $F_{roll}$ is the rolling resistance, and $F_{air}$ is the air drag. This relationship is generally known and will therefore not be discussed in more detail herein. The terms can be determined as $$F_g(s(t)) = -m\, g\, \sin(\lambda_p(s(t)))$$

$$F_{roll}(s(t)) = m\, g\, f_r\, \cos(\lambda_p(s(t)))$$

$$F_{air}(v_x(t)) = 0.5\rho_a A_f c_d v_x(t)^2$$

where g, $\lambda_p$, $f_r$, $\rho_a$, $A_f$, and $c_d$ represent the gravitational constant, road grade (positive downhill), rolling resistance coefficient, air density, equivalent vehicle front area and air drag coefficient, respectively.

The term $F_{steer}$ approximates all forces caused by steering and from the articulation angles, i.e., side slips of the tires, as well as the rotational inertia. This term is close to zero in straight road driving and is negligible for single-unit vehicles. However, for articulated vehicles on curved roads, the term cannot be neglected for accurate state and energy consumption estimations.

The total power at the wheels $P_w(t) = F_w(t)v_x(t)$, where $v_x(t)$ is longitudinal velocity.

The energy flow (i.e., power transfer) between different powertrain subsystems for a given interval of time will now be described in relation to FIG. 10.

Let $P_f$, $P_e$, $P_{de}$, $P_{ew}$, and $P_{det}$ denote, respectively, powers associated with the fuel tank, with the ICE output, dissipated by the ICE, at the ICE transmission output and dissipated in ICE transmission, respectively. On the electric propulsion side, let $P_b$, $P_{db}$, $P_a$, $P_{mc}$, $P_{dm}$, $P_m$, $P_{dmt}$, $P_{mw}$ represent the powers provided by or stored in the battery, dissipated in the battery, used for auxiliaries, consumed or regenerated by EM, dissipated in EM, at EM output/input to/from transmission, dissipated in EM transmission and at output/input to/from wheels, respectively. Likewise, let $P_{br}$ be the friction brake power. Then, by defining the energy flow as positive if it flows out of a subsystem, e.g., all dissipative terms are positive, the power balance equation for each subsystem can be written as follows. A power balance can be assumed since there is no energy storage or generation inside the powertrain, except that in the fuel tank and battery, i.e., no inertial flywheels or elastic shafts are modelled.

$$P_e + P_{de} - P_f = 0$$

$$P_{ew} + P_{det} - P_e = 0$$

$$P_w + P_{br} - P_{ew} - P_{mw} = 0$$

$$P_{mw} + P_{dmt} - P_m = 0$$

$$P_m + P_{dm} - P_{mc} = 0$$

$$P_{mc} + P_{db} - P_a - P_b = 0$$

In the above equations, function arguments are omitted for increased readability. Again, these relationships are known in general and will therefore not be discussed in more detail herein. For example, the powertrain component dissipations are, in general, nonlinear functions of speed, component power, selected ICE gear, and selected EM gear. Furthermore, terms describing the inertia of rotating parts in the driveline and wheels and energy loss due to tire slip are neglected; however, the inertia of rotating parts can be taken into account by considering the equivalent additional mass.

The power dissipation of the ICE and the EM can, e.g., be modelled by direct use of data from measured maps or by using high-degree nonlinear fitted curves. Measurements can, e.g., be performed for varying torques and angular speeds. The torque and angular speed of the ICE and the EM can be calculated based on their power and vehicle speed as follows $$\omega_e(t) = \frac{r_e(\gamma_e(t))}{R} v_x(t)$$

$$T_e(t) = \frac{1}{\omega_e(t)} P_e(t)$$

$$\omega_m(t) = \frac{r_m(\gamma_m(t))}{R} v_x(t)$$

$$T_m(t) = \frac{1}{\omega_m(t)} P_m(t)$$

where R, $r_e$, $T_e$, $\omega_e$, $r_m$, $T_m$, and $\omega_m$ denote the wheel radius, gear ratio from wheel to engine, engine torque, engine speed, gear ratio from wheel to EM, EM torque and EM speed, respectively.

Furthermore, power P, energy E, force F, torque T and velocity $v_x$ are related according to $$P(s) = \frac{dE(s)}{dt} = v_x(s) \frac{dE(s)}{ds} = v_x(s) F(s) = \omega(s) T(s)$$

A general polynomial surface fitting of degree n can be applied to represent ICE fuel energy rate $\dot{E}_f = P_f$ and EM consumed power $P_{mc}$. Other surface fitting functions can of course also be used with similar effect.

The battery can be modelled, e.g., as a constant open circuit voltage, $V_{oc}$, with resistance R. Therefore, the battery dissipated energy can be calculated as follows, assuming that the voltage drop due to battery resistance is negligible.

$$P_{db}(P_{mc}(t), P_a(t)) = \frac{R}{V_{oc}^2}(P_{mc} + P_a)^2$$

Furthermore, transmission dissipation can be assumed to be linear with respect to the power input being independent of gear selection:

$$P_{det}(P_e(t)) = P_e(t) - \eta_{te} P_e(t)$$

$$P_e(t) \geq 0$$

$$P_{dmt}(P_m(t)) = \begin{cases} P_m(t) - \eta_{tm} P_m(t) & \text{if } P_m(t) > 0 \\ -\left(\dfrac{P_m(t)}{\eta_{tm}} - P_m(t)\right) & \text{if } P_m(t) \leq 0 \end{cases}$$

where $\eta_{te}$ $\eta_{tm}$ represent the transmission efficiency of the ICE and the EM, respectively. The negative sign in the second part above is needed in order to keep $P_{dmt}$ positive.

In addition to the energy balance of the powertrain components, their capability limits in transforming energy can be considered. The limits of transforming energy in the engine and EM are enforced by limiting the maximum and minimum torque that can be produced.

Finally, the storage capacity and power of the battery is of course limited. The state of charge (SOC) is used herein as a state and a measure for battery capacity.

$$SOC(t_f) = SOC(t_0) - \frac{1}{E_{bmax}} \int_{t_0}^{t_f} P_b(t) dt$$

where $E_{bmax}$ denotes the maximum energy capacity of the battery.

Let s be a vehicle path variable, $F_{xx}$ denote a force corresponding to the above-mentioned powers $P_{xx}$ (as illustrated, e.g., in FIG. 10), $\gamma_e$ is an integer gear of the ICE, $\gamma_m$ is an integer gear of the EM, $R_w$ is wheel radius, $V_b^2$ is the battery open circuit voltage, $r_e$ is the ICE gearbox and final ratio and $r_m$ is the EM gearbox and final ratio.

The NOCP can now be defined, e.g., as follows.

find $F_e(s)$, $F_{mw}(s)$, $F_{br}(s)$, $\gamma_e(s)$, $\gamma_m(s)$ to minimize $$J^{nl} = \int_{s=s_0}^{s=s_f} F_f(\cdot) + F_{br}(s) - F_{mw}(s) + F_{mc}(s) + \left(\frac{R_w v_x(s)}{V_b^2} F_{mc}(s) + F_a(s)\right)^2 ds$$

subject to fuel equivalent force constraints:

$$F_f(F_e(s), v_x(s), \gamma_e(s), s) =$$

$$\frac{1}{v_x(s)} \sum_{i=0}^{5} \sum_{j=0}^{5} a_{ij} \left(\frac{r_e(\gamma_e(s))}{R} v_x(s)\right)^i \left(\frac{R_w}{r_e(\gamma_e(s))} F_e(s)\right)^j$$

longitudinal dynamics equation:

$$\frac{dv_x(s)}{ds} = \frac{1}{mv(s)}\left(F_{br}(s) - \eta_{te}F_e(s) - F_{mw}(s) + \right.$$
$$\left. mg\sin\alpha(s) - mg\,f_x\cos\alpha(s) - 0.5\rho_a A_f c_d v_x(s)^2 + c\,v_x(s)\,\delta_{11}(s)^2\right),$$

lateral dynamic equations:

$$F\left(x(s), \frac{dx(s)}{ds}, A_u(s)u(s), s\right) = 0,$$

battery SOC dynamic:

$$\frac{dsoc(s)}{ds} = -\frac{1}{E_{bmax}}\left(F_{mc}(s) + \frac{Rv_x(b)}{V_b^2}(F_{mc}(s) + F_a(s))^2 + F_a(s)\right),$$

time dynamic:

$$\frac{dt(s)}{ds} = \frac{1}{v_x(s)},$$

initial and terminal states:

$$v(s_0)=v, soc(s_0)=soc_0, t(s_0)=t_0,$$

$$soc(s_f)=soc_f.$$

ICE torque upper limit:

$$\frac{R_w}{r_e(\gamma_e(s))}F_e(s) - \min\left\{\sum_{j=0}^{3}b_{ij}^e\left(\frac{r_e(\gamma_e(s))}{R_w}v_x(s)\right)^j, i=1,\dots,4\right\} \le 0,$$

EM torque limits:

$$\frac{R_w F_{mw}(s)}{r_m(\gamma_m(s))\eta_{tm}} - \min\left\{\sum_{j=0}^{3}b_{ij}^m\left(\frac{r_m(\gamma_m(s))}{R_w}v_x(s)\right)^j, i=1,2\right\} \le 0,$$

$$-\frac{R_w F_{mw}(s)\eta_{tm}}{r_m(\gamma_m(s))} + \max\left\{\sum_{j=0}^{3}b_{ij}^m\left(\frac{r_m(\gamma_m(s))}{R_w}v_x(s)\right)^j, i=3,4\right\} \le 0,$$

arrival time:

$$t(s_f)-t_{ref}(s_f)\le 0,$$

battery SOC limits:

$$soc_{min}-soc(s)\le 0.$$

$$soc(s)-soc_{max}\le 0,$$

battery power limits:

$$p_{bmin} - v_x(s)\left(F_{mc}(s) + \frac{Rv_x(s)}{V_b^2}(F_{mc}(s) + F_a(s))^2 + F_b(s)\right) \le 0,$$

$$v_x(s)\left(F_{mc}(s) + \frac{Rv_x(s)}{V_b^2}(F_{mc}(s) + F_a(s))^2 + F_a(s)\right) - p_{bmax} \le 0,$$

speed limits:

$$v_{min}(s)-v_x(s)\le 0,$$

$$v_x(s)-v_{max}(s)\le 1,$$

ICE torque (force) lower limit:

$$-F_e(s)\le 0.$$

friction brake lower limit:

$$-F_{br}(s)\le 0,$$

tire model:

$$F_{xij}=f_x(v_{xij}, v_{yij}, w_{ij}),$$

$$F_{yij}=f_y(v_{xij}, v_{yij}, w_{ij}),$$

tire or axle force limits:

$$|F_{xij}(s)|\le F_{xij,max}(s)$$

slip limits:

$$|\lambda_{xij}(s)|\le\lambda_{xij,max}(s)$$

$$|\lambda_{yij}(s)|\le\lambda_{yij,max}(s)$$

The NOCP states are $$x=[\phi_1, v_x, v_y, \dot{\phi}_1, \theta_1, \theta_2, \theta_3, \dot{\theta}_1, \dot{\theta}_2, \dot{\theta}_3, soc, t]$$

where $\phi_1, \dot{\phi}_1$ is the first vehicle unit 110 yaw angle and time derivate, $v_x$ is the first vehicle unit 110 longitudinal speed, $v_y$ is the first vehicle unit 110 lateral speed, $\theta_1$, $\theta_2$, $\theta_3$, $\dot{\theta}_1$, $\dot{\theta}_2$, $\dot{\theta}_3$ are articulation angles and their time derivatives, t is time and SOC is the state of charge of the battery system. The inputs, for example, can be:

$$u=[F_e, F_{mw}, F_{br}, \gamma_e, \gamma_m]$$

Note the term $cv_x\delta_{11}^2$ which was added to the longitudinal dynamic equation. This is a factor determining the effect of side slip in longitudinal velocity, that relates to the vertical load and cornering stiffness of each tire. Moreover, $A_u$, maps the EMS inputs (decision variables) to the input forces used in the lateral dynamics model. The lateral dynamics model can be according to the article "Computationally efficient nonlinear one- and two-track models for multitrailer road vehicles," T. Ghandriz, B. Jacobson, P. Nilsson, and L. Laine, IEEE Access, pp. 1-22, 2020. DOI: 10.1109/ACCESS.2020.3037035

It is appreciated that the constraints can be formulated in different ways mathematically with similar technical effect. It is furthermore appreciated that the type of NOCP described above can then be solved by computer-based solution methods known in the art.

The input-output system of the above approach, according to an example, can be described as follows.

Inputs:

vehicle estimated parameters including vehicle units' mass, inertia, size, position of axles, centre of gravity, size of tyres, position of coupling joints and number of wheels per axle, front area, rolling resistance coefficient.

road friction estimation for the upcoming horizon (a rough estimation for the long horizon, e.g., 10 km, and a more accurate estimation for a shorter horizon, e.g., 400 m.)

road grade and banking, and curvature for the upcoming horizon (or the whole trip);

battery, EMs and ICE power and torque limits as well as their power consumption (loss) maps, efficiency of transmissions;

gearboxes (related to Ems and ICE) number of gears and their ratios, final gear transmission ratio;

road speed limit (and speed limits caused by traffic);

tyre model parameters;

current vehicle speed, position, state of charge and gears (state feedbacks).

Outputs:

desired optimal vehicle acceleration (or vehicle speed), SOC, gears (related to EMs and ICE), optimal tyres' longitudinal slips, optimal (lumped) axles brake force and propulsion forces (or torques)

According to some aspects, the vehicle motion profile comprises a target tyre force trajectory and/or a target wheel slip trajectory for at least two wheels to be followed along the upcoming vehicle path p. The vehicle motion profile a may also, as mentioned above, comprise a target vehicle unit acceleration and/or a target vehicle speed to be followed along the upcoming vehicle path p. Both the target force trajectory and the acceleration profile have been generated under slip constraints, which means that they are safe in the meaning that the vehicle can be controlled to behave according to the target forces trajectory and/or the acceleration profile without experiencing wheel slip in excess of the configured slip limits.

Solving the NOCP may in some cases be associated with prohibitive computational complexity. To reduce the computational complexity and thereby allow real-time vehicle control based on processing of NOCP solutions, some complexity reducing steps may be taken.

For instance, the method may comprise any of:

Converting S42 the NOCP to a sequential program and determining the vehicle motion profile as a solution to the sequential program. For instance, methods comprising model predictive control (linear or nonlinear) can be used with advantage.

Configuring S43 a nonlinear single-track vehicle model of the heavy-duty vehicle 100a, 100b with lumped group-axles 115, 125, 135, 145, 155.

Reducing S44 a number of states in one or more longitudinal dynamic equations of the NOCP.

Configuring S45 two different levels of discretization for longitudinal and lateral dynamic equations of the NOCP, preferably a first discretization for the longitudinal dynamic equations of the NOCP and a second discretization for the lateral dynamic equations of the NOCP, wherein the first discretization is more coarse than the second discretization.

Configuring S46 a linear time-varying, LTV, version of the lateral dynamic equations of the NOCP and/or the combined tyre slip model, where the LTV is linearized around an initial reference vehicle motion profile along the path p.

Solving S471 a differential-algebraic system of equations (DAE) comprising algebraic equations of the combined tyre slip model of each of a set of lumped axles of the heavy-duty vehicle to find wheel speed reference trajectories for each axle on the heavy-duty vehicle.

Linearizing S472 longitudinal algebraic equations $F_x = f_x$ $(v_x, v_y, \omega)$ of each of the lumped axles around the corresponding wheel speed reference trajectory, and solving the resulting linearized equations for wheel speed symbolically, such that $\omega = f_{x,lin}^{-1}(v_x, v_y, F_x)$ for each wheel, and Substituting S473 the wheel speed expressions $\omega$ into respective expressions for lateral tyre force $F_y = f_y(v_x, v_y, \omega)$.

Figure 8:
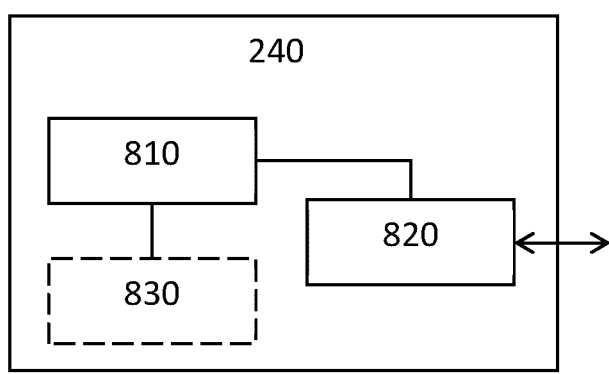
FIG. 8 schematically illustrates a control unit.

FIG. 8 schematically illustrates, in terms of a number of functional units, the components of a control unit 240 according to embodiments of the discussions and methods disclosed herein. This control unit 240 may be comprised in the vehicle 100a, 100b, e.g., in the form of a vehicle motion management (VMM) unit configured to perform force allocation and the like. Processing circuitry 810 is provided using any combination of one or more of a suitable central processing unit CPU, multiprocessor, microcontroller, digital signal processor DSP, etc., capable of executing software instructions stored in a computer program product, e.g. in the form of a storage medium 830. The processing circuitry 810 may further be provided as at least one application specific integrated circuit ASIC, or field programmable gate array FPGA.

Particularly, the processing circuitry 810 is configured to cause the control unit 240 to perform a set of operations, or steps, such as the methods discussed in connection to FIG. 7. For example, the storage medium 830 may store the set of operations, and the processing circuitry 810 may be configured to retrieve the set of operations from the storage medium 830 to cause the control unit 240 to perform the set of operations. The set of operations may be provided as a set of executable instructions. Thus, the processing circuitry 810 is thereby arranged to execute methods as herein disclosed.

The storage medium 830 may also comprise persistent storage, which, for example, can be any single one or combination of magnetic memory, optical memory, solid state memory or even remotely mounted memory.

The control unit 240 may further comprise an interface 820 for communications with at least one external device, such as an electric machine or a gearbox. As such the interface 820 may comprise one or more transmitters and receivers, comprising analogue and digital components and a suitable number of ports for wireline or wireless communication.

The processing circuitry 810 controls the general operation of the control unit 240, e.g., by sending data and control signals to the interface 820 and the storage medium 830, by receiving data and reports from the interface 820, and by retrieving data and instructions from the storage medium 830. Other components, as well as the related functionality, of the control node are omitted in order not to obscure the concepts presented herein.

Figure 9:
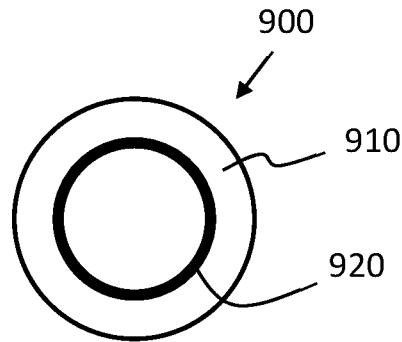
FIG. 9 shows an example computer program product.

FIG. 9 illustrates a computer readable medium 910 carrying a computer program comprising program code means 920 for performing, e.g., the methods illustrated in FIG. 7, when said program product is run on a computer. The computer readable medium and the code means may together form a computer program product 900.

The invention claimed is:

1. A method for controlling motion of a heavy-duty vehicle, comprising obtaining information related to an upcoming vehicle path and vehicle maneuver along the path, configuring lateral and longitudinal wheel slip limits for at least two wheels of an axle or lumped group-axle on the heavy-duty vehicle, wherein lateral and longitudinal wheel slip values are related to respective lateral and longitudinal tire force values via a pre-determined combined tire slip model, determining a vehicle motion profile for performing the vehicle maneuver along the path as a solution to a non-linear optimal control problem (NOCP), wherein the NOCP is constrained by the lateral and longitudinal wheel slip limits, and controlling the motion of the heavy-duty vehicle along the path based on the determined target vehicle motion profile.

2. The method according to claim 1, comprising obtaining information related to a road friction coefficient and/or curvature along the upcoming vehicle path, wherein the NOCP is formulated to account for the road friction coefficient and/or curvature along the upcoming vehicle path.

3. The method according to claim 1, wherein the vehicle motion profile comprises a target tire force trajectory and/or a target wheel slip trajectory for at least two wheels to be followed along the upcoming vehicle path.

4. The method according to claim 1, wherein the vehicle motion profile comprises a target vehicle unit acceleration and/or a target vehicle speed to be followed along the upcoming vehicle path.

5. The method according to claim 1, wherein the heavy-duty vehicle comprises a propulsion actuator with regenerative braking capability on more than one driven axle.

6. The method according to claim 1, wherein the heavy-duty vehicle is a multitrailer vehicle comprising a self-powered dolly vehicle unit.

7. The method according to claim 1, comprising determining the vehicle motion profile for performing the vehicle maneuver along the path as a solution to a non-linear optimal control problem (NOCP), wherein the NOCP is configured to minimize an energy consumption by the vehicle along the path.

8. The method according to claim 1, comprising converting the NOCP to a sequential program and determining the vehicle motion profile as a solution to the sequential program.

9. The method according to claim 1, comprising configuring a nonlinear single-track vehicle model of the heavy-duty vehicle with lumped group-axles.

10. The method according to claim 1, comprising reducing a number of states in one or more longitudinal dynamic equations of the NOCP.

11. The method according to claim 1, comprising configuring two different levels of discretization for longitudinal and lateral dynamic equations of the NOCP, wherein the two different levels of discretization comprise a first discretization for the longitudinal dynamic equations of the NOCP and a second discretization for the lateral dynamic equations of the NOCP, wherein the first discretization is more coarse than the second discretization.

12. The method according to claim 1, comprising configuring a linear time-varying (LTV) version of the lateral dynamic equations of the NOCP and/or the combined tire slip model, where the LTV is linearized around an initial reference vehicle motion profile along the path.

13. The method according to claim 1, comprising solving a differential-algebraic system of equations (DAE) comprising algebraic equations of the combined tire slip model of each of a set of lumped axles of the heavy-duty vehicle to find wheel speed reference trajectories for each axle on the heavy-duty vehicle linearizing longitudinal algebraic equations $F_x = f_x(v_x, v_y, \omega)$ of each of the lumped axles around the corresponding wheel speed reference trajectory, and solving the resulting linearized equations for wheel speed symbolically, such that $\omega = f_{x,lin}^{-1}(v_x, v_y, F_x)$ for each wheel, and substituting the wheel speed expressions w into respective expressions for lateral tyre force $F_y = f_y(v_x, v_y, \omega)$, wherein $F_x$ represents longitudinal tyre force, $F_y$ represents lateral tyre force, $v_x$ represents longitudinal tyre velocity, $v_y$ represents lateral tyre velocity, $\omega$ represents wheel speed, $f_x(\bullet)$ is a function for representing tyre longitudinal force, $f_y(\bullet)$ is a function for representing tyre lateral force, and $f_{x,lin}^{-1}(\bullet)$ represents a solution for a linearized version of $f_x(\bullet)$.

14. The method according to claim 1, wherein a distance of the path is between 5-1000 m.

15. The method according to claim 1, wherein the vehicle maneuver comprises a road speed limit to be adhered to.

16. The method according to claim 1, comprising controlling the motion of the heavy-duty vehicle by issuing any of: an acceleration request, a wheel torque request, and/or a wheel slip request, in dependence of the vehicle motion profile to one or more actuator control units of the heavy-duty vehicle.

17. A control unit comprising processing circuitry configured to perform the method according to claim 1.

18. A heavy-duty vehicle comprising the control unit according to claim 17.

* * * * *